US006807183B1

(12) United States Patent  
Chow et al.

(10) Patent No.: US 6,807,183 B1  
(45) Date of Patent: Oct. 19, 2004

(54) ARRANGEMENT FOR READING A PRESCRIBED LOCATION OF A FIFO BUFFER IN A NETWORK SWITCH PORT

(75) Inventors: Peter Ka-Fai Chow, San Jose, CA (US); Shr-Jie Tzeng, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/566,732

(22) Filed: May 9, 2000

(51) Int. Cl.⁷ .............................................. H04L 12/56
(52) U.S. Cl. ...................................... 370/401; 370/409
(58) Field of Search ................................ 370/389, 392, 370/401, 407, 408, 409, 445, 446

(56) References Cited

U.S. PATENT DOCUMENTS

| | | | | |
|---|---|---|---|---|
| 4,312,036 A | * | 1/1982 | Porter et al. ................... 711/3 |
| 4,644,529 A | * | 2/1987 | Amstutz et al. ............ 370/422 |
| 5,953,335 A | | 9/1999 | Erimli et al. |
| 5,991,299 A | * | 11/1999 | Radogna et al. ............ 370/392 |
| 6,108,713 A | * | 8/2000 | Sambamurthy et al. ..... 709/250 |
| 6,167,047 A | * | 12/2000 | Welfeld ....................... 370/389 |
| 6,424,659 B2 | * | 7/2002 | Viswanadham et al. .... 370/469 |
| 6,480,499 B1 | * | 11/2002 | Richards et al. ............ 370/412 |

FOREIGN PATENT DOCUMENTS

| | | | |
|---|---|---|---|
| EP | 665693 A2 | * 8/1995 | ............ H04N/7/50 |
| WO | WO 9959303 A2 | * 11/1999 | ........... H04L/12/56 |

OTHER PUBLICATIONS

Gupta, P. et al. "Classifying Packets with Hierarchical Intelligent Cuttings". IEEE Micro. Stanford Univ., Ca. Jan./Feb. 2000. vol. 20, iss 1. pp 34–41.*

Borg, N. et al. "Efficient Multi–Field Packet Classification for QoS Purposes". IWQoS '99. Seven International Workshop on Quality of Service, 1999. London, UK. May–Jun. 1999. pp. 109–118.*

* cited by examiner

*Primary Examiner*—John Pezzlo  
*Assistant Examiner*—Donald Mills  
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The filter performs simultaneous comparisons between the incoming data stream of the data packet and multiple templates configured for identifying respective data protocols. Each template is composed of a plurality of min terms, wherein each min term specifies a prescribed comparison operation within a selected data byte of the incoming data packet. The packet classifier includes a separate FIFO for storing the payload of the layer 2 data frame (e.g., the IP packet), and buffer read logic that enables the packet classifier to read selected portions of the payload as it is received by the network switch port. The multiple simultaneous comparisons enable the network switch to perform layer 3 switching for 100 Mbps and gigabit networks without blocking in the network switch.

12 Claims, 3 Drawing Sheets

ARRANGEMENT FOR READING A PRESCRIBED LOCATION OF A FIFO BUFFER IN A NETWORK SWITCH PORT

BACKGROUND OF THE INVENTION

1. Field of the Invention

The present invention relates to buffering of data packets in a non-blocking network switch configured for switching data packets.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

Commonly-assigned, copending application Ser. No. 09/430,753, filed Oct. 29, 1999, entitled Apparatus and Method for Identifying Data Packet Types in Real Time on a Network Switch Port discloses a network switch having a plurality of network switch ports, each network switch port having a filter (i.e., a packet classifier module) configured for evaluating an incoming data packet on an instantaneous basis. The filter performs simultaneous comparisons between the incoming data stream of the data packet and multiple templates configured for identifying respective data protocols.

A particular concern in implementing the above-described packet classifier module in each network switch port is minimizing the latency encountered between reception of the incoming data stream and actual comparison of the received data stream with the multiple templates. Although network switch ports conventionally have a first and first-out (FIFO) buffer for storing frame data received by the MAC, such FIFO buffers are not configured for enabling a packet classifier module to evaluate selected portions of the incoming frame data.

SUMMARY OF THE INVENTION

There is a need for an arrangement that enables a network switch to provide evaluation of an incoming data stream for 100 Mbps and gigabit links without blocking of the data packets and with minimal latency and complexity.

There is also a need for an arrangement that enables a packet classifier module within a network switch port to quickly access selected portions of an incoming data stream during reception by the network switch port.

These and other needs are attained by the present invention, where a network switch port having a packet classifier includes buffer read logic that enables the packet classifier to read selected portions of the incoming frame data as the incoming frame data is received by the network switch port.

One aspect of the present invention provides a method in a network switch port. The method includes the steps of determining whether a first in first-out (FIFO) buffer, configured for storing frame data of a received data packet, has stored a selected byte of the received data packet, and selectively generating a signal indicating availability of reading the selected byte of the received data packet within the FIFO buffer, based on the determination that the FIFO buffer has stored the selected byte. The selective generation of the signal indicating availability of reading the selected byte enables the network switch port to read the selected byte within the FIFO buffer, independent of the remaining frame data in the FIFO buffer. Hence, the network switch port can perform evaluations of selected bytes of the received data packet as the selected bytes are received, independent of the buffering of the entire received data frame.

Another aspect of the present invention provides an integrated network switch having a plurality of network switch ports. Each network switch port includes a media access control FIFO configured for storing frame data of a received layer 2 type data packet, the received layer 2 type data packet having a layer 2 header and a layer 2 payload, and a packet classifier module. The packet classifier module is configured for evaluating selected data bytes of the layer 2 payload, the packet classifier module including buffer read logic configured for reading the selected data bytes based on determined reception by the network switch port. Hence, the buffer read logic enables the packet classifier module to read the selected data bytes of the layer 2 payload, without extracting the entire received data packet from the media access control FIFO.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
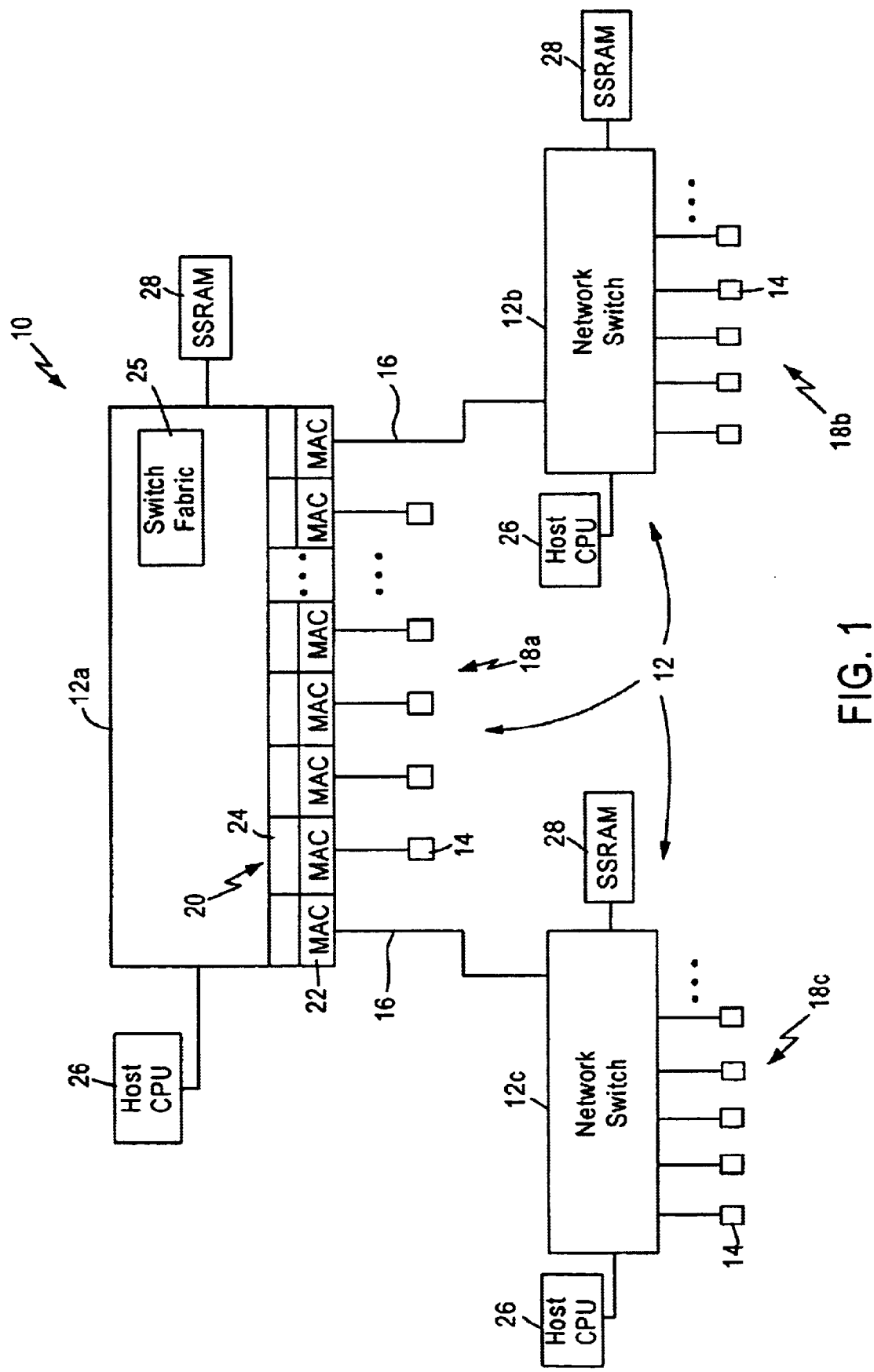
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

The packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 2:
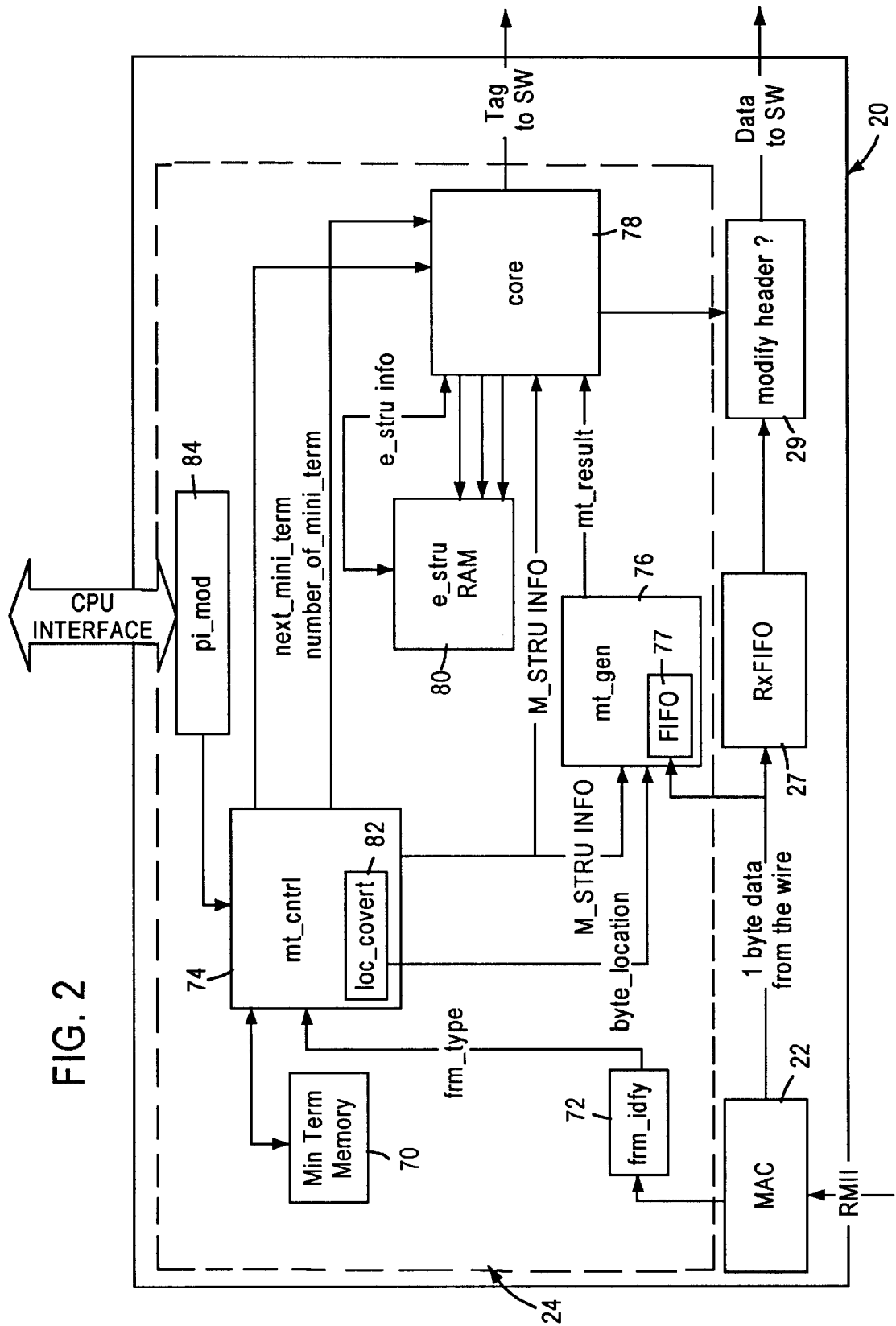
FIG. 2 is a block diagram illustrating the network switch port of FIG. 1, including the packet classifier module, according to an embodiment of the present invention.

FIG. 2 is a block diagram illustrating in further detail the packet classifier module 24 according to an embodiment of the present invention. As shown in FIG. 2, the network switch port 20 includes a MAC 22, a MAC receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares selected data bytes of the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

As shown in FIG. 2, the packet classifier 24, also referred to as a network switch port filter, includes a min term memory 70 for storing min term values that specify respective comparison operations to be performed for assigned templates. The packet classifier 24 also includes a frame identifier 72 configured for identifying the type of layer 2 frame being received; in particular, identifying the type of layer 2 frame being received (e.g., Ethernet, IEEE 802 to 3, etc.) enables identification of the start position an IP packet within the layer 2 packet. The packet classifier 24 also includes a min term controller 74, a min term generator 76, an equation core 78, and an evaluation results memory 80. A processor interface module (pi_mod) 84 is used for transferring the generated min terms from the host CPU 26 into the min term memory 70.

The min term controller 74 is configured for fetching the min terms from the min term memory 70 corresponding to a selected byte of the IP frame 32. The min term controller 74 also includes a location converter 82 configured for specifying the actual byte location (byte_location) of the start point of the IP frame in response to receiving a frame type (frm_type) signal from the frame identifier 72 that specifies the type of layer 2 frame. Hence, the min term controller 74, in response to detecting the beginning of the IP packet, fetches all the min terms that are to be compared with the corresponding selected byte, for example the first byte (B1) of the IP packet. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream. For example, the min term generator 76 simultaneously compares the incoming data byte B1 with the min terms and provides the min term comparison results (mt_result) to the equation core 78. During the next comparison cycle, the min term generator 76 simultaneously compares the next selected data byte of the IP packet (e.g., that specifies Internet Option Ipv4/Ipv6 or TCP/UDP source or destination ports) B2 with the next set of min terms. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates. The frame tag identifies the nature of the incoming data packet, as well as the action that needs to be performed by the switch fabric 25.

As described above, the min term generator 76 performs the actual min term comparisons between the min terms fetched by the min term controller and the selected byte of the incoming data stream. The min term generator 76 includes a FIFO 77 for temporary storage of the layer 2 payload (e.g., the IP frame) as the frame data is received, for comparison with the min terms supplied by the min term controller 74. The capacity of the FIFO 77 is 128 bytes. Hence, the min term generator 76 performs min term comparisons independent of the reception of the frame data by the receive FIFO 27.

Figure 3:
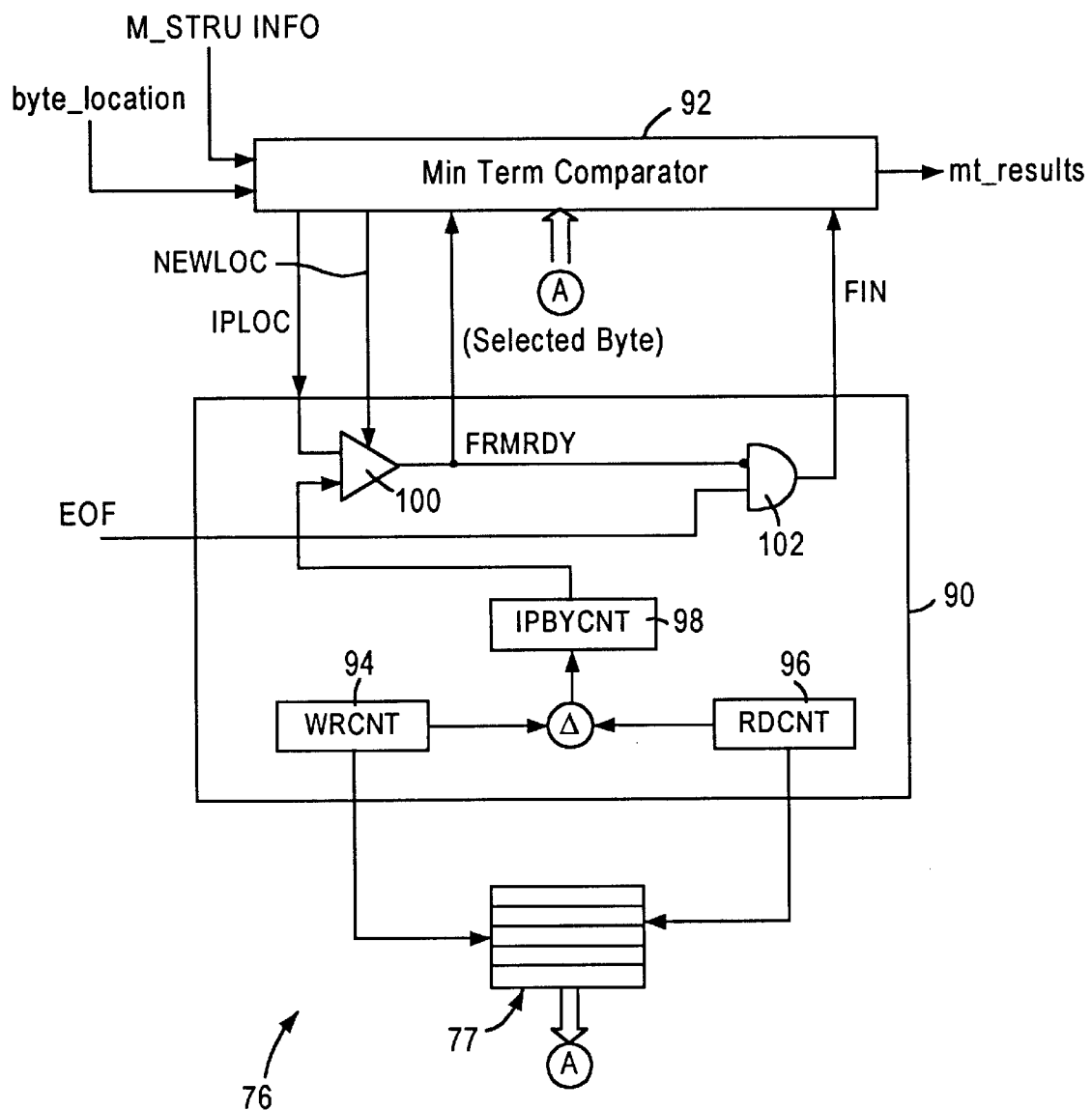
FIG. 3 is a block diagram illustrating in further detail the buffer read logic in the packet classifier module of FIG. 2.

FIG. 3 is a diagram illustrating in further detail the min term generator 76 according to an embodiment of the present invention. The min term generator 76 includes buffer read logic 90 configured for reading the selected data bytes stored in the FIFO 77 as the selected data bytes become available for comparison by the min term generator 76. The min term generator 76 also includes a min term comparator 92 configured for performing the simultaneous min term comparisons with the selected data byte stored in the FIFO 77. Conventional FIFO logic outputs stored data on a sequential basis, hence the term "first in first out" buffer memory. As described above, however, the min term generator 76 needs to access the selected data bytes of the IP frame as soon as the selected data bytes are received, for comparison with the corresponding set of min terms. In particular, the MAC 22 will not send the packet to the switch fabric 25 unless the data packet is larger than 64 bytes; hence, the min term generator 76 uses the 64-byte delay to finish the evaluation of all the equations before the end of the frame.

The buffer read logic 90 includes a write pointer counter 94 and a read pointer counter 96 configured for writing and reading the respective data bytes in the FIFO 77, respectively. The buffer read logic 90 also includes a byte counter 98 configured for identifying the number of stored data bytes for a corresponding IP frame in the FIFO 77. In particular, the FIFO 77 is configured for storing up to three IP frames; the write pointer counter 94 is incremented each time the corresponding byte in the FIFO 77 is stored; the read pointer counter 96 is incremented each time the corresponding selected byte is read from the FIFO 77 by the min term comparator 92 (additional control logic for the counters 94 and 96 is not shown). In addition, the write counter 94 is incremented to the beginning of a new IP frame as the new IP frame is received, and the read counter 96 is incremented to read the beginning of the new IP frame as the new IP frame is sent to the min term comparator 92. Hence, the byte counter 98 stores the number of stored bytes in the FIFO 77 (IPBYCNT) for the corresponding received IP frame.

The read logic 90 also includes a state-aware comparator circuit 100 configured for determining whether the value of the byte counter 98 (IPBYCNT) is greater than or equal to the selected byte (IPLOC) specified by the min term comparator 92 for comparison upon assertion of a new location signal (NEWLOC). If the value of the byte counter 98 is greater than or equal to the selected byte (IPLOC), indicating availability of the selected byte in the FIFO 77, the comparator circuit 100 outputs a frame ready signal (FRMRDY=1). However if the value of the byte counter 98 is less than the selected byte (IPLOC), indicating the selected byte is not available yet in the FIFO 77, the comparator 100 deasserts the frame ready signal (FRMRDY=0) until the value of the byte counter 98 reaches the value of the selected byte. Although not shown, the comparator circuit 100 includes a flip-flop and associated circuitry to store the occurrence of the new location signal (NEWLOC) while waiting for the value of the byte counter 98 to reach the value of the selected byte.

Instances may arise where an end of frame condition is reached before the FIFO 77 has stored the data byte of the IP frame that is to be selected as specified by the value IPLOC. The logic 90 includes a signal generator 102, illustrated as an AND gate, that outputs a finish signal (FIN) based on an end of frame signal (EOF) from the MAC 22 indicating an end of the layer 2 type data frame, and based on the frame ready signal having a zero value (FRMRDY=0). Hence, the min term comparator 92 can signal to the core module 78 that further evaluation of the min terms for the templates cannot be performed due to the end of frame condition, enabling the core to abort the template evaluation process.

According to the disclosed embodiment, buffer read logic enables selected data bytes of the IP portion of the data frame to be accessed for comparison with min terms. Use of the buffer read logic for reading the selected data bytes of the IP portion of the data frame from the FIFO 77 enables the packet classifier module 24 to finish evaluation of all equations before the end of the layer 2 type data frame has been detected by the MAC 22. Hence, the packet classifier module 24 enables simultaneous comparisons of min terms with selected data bytes of an IP frame as the data bytes are received, without adversely affecting the latency during switching of the received data packet.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch port, the method comprising:

determining whether a first in first-out (FIFO) buffer, configured for storing frame data of a received data packet, has stored a selected byte of the received data packet; and selectively generating a signal indicating availability of reading the selected byte of the received data packet within the FIFO buffer, based on the determination that the FIFO buffer has stored the selected byte;

wherein the determining step includes:

determining a prescribed start position of the received data packet;

determining a number of stored bytes of the stored frame data within the FIFO buffer relative to the prescribed start position; and comparing whether the number of stored bytes is greater than or equal to the selected byte relative to the prescribed start position.

2. The method of claim 1, wherein the step of determining a prescribed start position includes determining a start position of a layer 3 header within the received data packet.

3. The method of claim 2, further comprising receiving a byte location as the supplied value relative to the start position of the layer 3 header.

4. The method of claim 3, wherein the layer 3 header is an Internet protocol (IP) header.

5. The method of claim 3, wherein the selectively generating step includes selectively generating an end of frame signal indicating an unavailability of reading the selected byte, based on detecting an end of the received data packet before the FIFO buffer has stored the selected byte.

6. The method of claim 5, further comprising:

storing a layer 2 header and a layer 2 payload of the received data packet in a media access control (MAC) FIFO;

transferring the layer 2 payload, corresponding to the start position of the layer 3 header, from the MAC FIFO to the FIFO buffer.

7. The method of claim 1, further comprising:

storing a layer 2 header and a layer 2 payload of the received data packet in a media access control (MAC) FIFO;

transferring the layer 2 payload from the MAC FIFO to the FIFO buffer.

8. The method of claim 1, further comprising outputting the selected byte to a packet classifier module within the network switch port, in response to a read signal following the generated signal.

9. A method in a network switch port, the method comprising:

determining whether a first in first-out (FIFO) buffer, configured for storing frame data of a received data packet, has stored a selected byte of the received data packet; and selectively generating a signal indicating availability of reading the selected byte of the received data packet within the FIFO buffer, based on the determination that the FIFO buffer has stored the selected byte;

storing a layer 2 header and a layer 2 payload of the received data packet in a media access control (MAC) FIFO; and transferring the layer 2 payload from the MAC FIFO to the FIFO buffer;

wherein determining step includes:

counting a number of stored bytes of the layer 2 payload within the FIFO buffer; and comparing whether the number of stored bytes is greater than or equal to the selected byte relative to a start position of the layer 2 payload.

10. The method of claim 9, wherein the start position specifies a start position of a layer 3 header within the layer 2 payload.

11. An integrated network switch having a plurality of network switch ports, each network switch port comprising:

a media access control FIFO configured for storing frame data of a received layer 2 data packet, the received layer 2 data packet having a layer 2 header and a layer 2 payload; and a packet classifier module configured for evaluating selected data bytes of the layer 2 payload, the packet classifier module including:

(1) buffer read logic configured for reading the selected data bytes based on determined reception by the network switch port, and (2) a second FIFO configured for storing the layer 2 payload, the buffer read logic selectively generating a first signal indicating availability of reading a corresponding one of the selected bytes from the second FIFO based on a common number of stored bytes within the second FIFO reaching the corresponding one selected byte;

wherein the buffer read logic selectively generates a second signal indicating an unavailability of reading the corresponding one selected byte, based on detecting an end of the received data packet before the second FIFO buffer has stored the corresponding one selected byte.

12. The switch of claim 11, wherein the buffer read logic is configured for supplying the corresponding one selected byte to the packet classifier module for evaluation based on the first signal.

* * * * *